US 8,442,126 B1

(12) United States Patent
Moss et al.

(10) Patent No.: US 8,442,126 B1
(45) Date of Patent: May 14, 2013

(54) SYNCHRONIZING AUDIO AND VIDEO CONTENT THROUGH BUFFER WRAPPERS

(75) Inventors: Nicolas Moss, Aptos, CA (US); Bradley Ford, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1685 days.

(21) Appl. No.: 11/153,035

(22) Filed: Jun. 14, 2005

(51) Int. Cl.
*H04N 7/12* (2006.01)

(52) U.S. Cl.
USPC .................................................. 375/240.28

(58) Field of Classification Search .............. 375/240.28
See application file for complete search history.

(56) References Cited

U.S. PATENT DOCUMENTS

| 5,659,539 | A | | 8/1997 | Porter et al. |
| 5,946,318 | A | * | 8/1999 | Post .............................. 370/412 |
| 5,960,006 | A | * | 9/1999 | Maturi et al. .................. 370/509 |
| 6,058,141 | A | | 5/2000 | Barger et al. |
| 6,064,771 | A | | 5/2000 | Migdal et al. |
| 6,148,135 | A | * | 11/2000 | Suzuki ........................... 386/201 |
| 6,408,029 | B1 | | 6/2002 | McVeigh et al. |
| 6,496,601 | B1 | | 12/2002 | Migdal et al. |
| 6,574,278 | B1 | | 6/2003 | McVeigh et al. |
| 6,728,315 | B2 | | 4/2004 | Haskell et al. |
| 6,940,903 | B2 | | 9/2005 | Zhao et al. |
| 6,983,015 | B1 | * | 1/2006 | Saunders et al. ........... 375/240.1 |
| 2001/0053183 | A1 | | 12/2001 | McVeigh et al. |
| 2002/0136294 | A1 | | 9/2002 | Culbert |
| 2003/0118117 | A1 | | 6/2003 | McVeigh et al. |
| 2003/0175012 | A1 | * | 9/2003 | Okada et al. .................... 386/69 |
| 2003/0182620 | A1 | * | 9/2003 | Errico et al. .............. 715/500.1 |
| 2003/0231863 | A1 | * | 12/2003 | Eerenberg et al. .............. 386/68 |
| 2003/0235392 | A1 | | 12/2003 | Boston et al. |
| 2003/0235393 | A1 | | 12/2003 | Boston et al. |
| 2003/0235394 | A1 | | 12/2003 | Boston et al. |
| 2003/0235395 | A1 | | 12/2003 | Boston et al. |
| 2003/0235396 | A1 | | 12/2003 | Boston et al. |
| 2003/0237085 | A1 | | 12/2003 | Boston et al. |
| 2003/0237086 | A1 | | 12/2003 | Boston et al. |
| 2003/0237090 | A1 | | 12/2003 | Boston et al. |
| 2004/0101271 | A1 | | 5/2004 | Boston et al. |
| 2004/0101272 | A1 | | 5/2004 | Boston et al. |
| 2004/0233996 | A1 | * | 11/2004 | Jung et al. ................ 375/240.26 |
| 2004/0268397 | A1 | | 12/2004 | Dunbar et al. |

OTHER PUBLICATIONS

"DV", Wikipedia, the free encyclopedia [Online], retrieved from the internet at <http://wikipedia.org/wiki/DV>, retrieved on Sep. 22, 2005, 4 pages.

(Continued)

*Primary Examiner* — Richard Torrente
(74) *Attorney, Agent, or Firm* — Kenyon & Kenyon LLP

(57) ABSTRACT

Techniques for synchronizing audio and video content are provided. According to techniques described herein, a data stream represents video frames and audio samples. For each video frame in the data stream, data structures, which refer to the video frame and to corresponding audio samples or parts thereof, and produced. These data structures indicate times at which the video frame and audio samples, or parts thereof, should be presented. As the data structures are passed among modules of a program, the video frames and/or audio samples to which the data structures refer may be processed. The time indicated in each data structure is preserved throughout the processing. Thus, when the data structures are passed to a file writing thread, the file writing thread can determine, from the time indicated in each data structure, the audio samples or parts thereof that should be played when corresponding video frames are displayed.

36 Claims, 3 Drawing Sheets

OTHER PUBLICATIONS

"HDV", Wikipedia, the free encyclopedia [Online], retrieved from the internet at <http://wikipedia.org/wiki/HDV>, retrieved on Sep. 22, 2005, 3 pages.

"MPEG-2", Wikipedia, the free encyclopedia [Online], retrieved from the internet at <http://wikipedia.org/wiki/MPEG-2>, retrieved on Sep. 22, 2005, 6 pages.

* cited by examiner

SYNCHRONIZING AUDIO AND VIDEO CONTENT THROUGH BUFFER WRAPPERS

FIELD OF THE INVENTION

The present invention relates to audiovisual data stream processing techniques and, more specifically, to a technique for synchronizing video content with audio content by generating, for each type of content, separate data structures that contain timing information, and by using these data structures to refer to the content.

BACKGROUND

Recently, a new kind of motion video camera has become commercially available. This new kind of camera records motion video content in the High Definition Video (HDV) format. The HDV format provides the high resolution of the High Definition (HD) standard, while remaining compatible with relatively inexpensive and widely used recording media that conform to the Digital Video (DV) standard. An HDV compliant camera can record a HD compliant motion video stream onto a DV-compliant mini videotape, for example.

An HDV-compliant motion video stream differs in several respects from a motion video stream that complies only with the earlier DV standard. One difference is that an HDV stream captures motion video content in a significantly higher resolution than a DV stream. Additionally, the way that video frames are represented in an HDV stream differs from the way that video frames are represented in a DV stream. More specifically, in a DV stream, each video frame is represented entirely, and independently of any other frame; each video frame can be completely interpreted and represented without using any information from any other video frame in the DV stream. Such independent video frames are called "I-frames." Because each video frame in a DV stream is an I-frame, a relatively low resolution DV stream occupies all, or nearly all, of the storage capacity, or "bandwidth," of a DV-compliant videotape.

Because a relatively low resolution DV stream occupies all, or nearly all, of the bandwidth provided by a DV-compliant videotape, it is not possible to store an even higher resolution video stream on a DV-compliant videotape without employing some kind of compression that is greater than the kind that DV already uses. If an HDV stream comprised only I-frames, then the HDV stream would exceed the bandwidth of the DV-compliant videotape.

Therefore, an HDV stream comprises content that has been compressed according to the MPEG-2 standard. As a result of the compression, the HDV stream contains some I-frames, but also contains some partial, "predictive" frames, or "P-frames," that only express differences from the content represented in an I-frame. Because P-frames only express differences from the I-frames on which they depend, P-frames occupy less bandwidth than I-frames do. In addition to I-frames and P-frames, an HDV stream may contain some "bidirectional" frames, or "B-frames," that only express differences from I-frames and P-frames that occur before or after those B-frames in the HDV stream. Frames often occur within an HDV stream in an order that is different from the order in which the content represented by those frames should be presented.

Because an HDV stream comprises compressed content with unusual frame ordering, an HDV stream is less compatible with computer programs that allow users to edit audiovisual streams. Typically, such computer programs play audiovisual streams I-frame-by-I-frame, and a user selects individual I-frames or ranges of I-frames to modify or delete. Because an HDV stream does not contain only I-frames, and contains frames in an order other than the intended presentation order, one approach to importing an HDV stream involves translating the HDV stream into a less compressed, I-frame only format, before playing the represented audiovisual content to a user. For example, according to one approach, an HDV stream is completely decompressed and stored on disk in a non-HDV format, then edited, and then completely re-compressed into an HDV format.

Unfortunately, the complete decompression of an entire HDV stream can consume a significant amount of time. Depending on the size of the original HDV stream, the non-HDV stream resulting from the decompression can occupy an enormous amount of space on disk. Additionally, some aspect of the audiovisual content may be lost through the decompression and recompression process.

Furthermore, when a multithreaded audiovisual stream-processing program receives an audiovisual stream as input, the processing program typically splits that stream into two separate streams: a video stream, and an audio stream. The video stream may be provided as input to one or more threads of execution, and the audio stream may be provided as input to one or more other threads of execution. The threads that process the video stream typically execute concurrently with the threads that process the audio stream. At some point, the editing program might need to write both the audio stream and the video stream to an output file; a file writing thread usually performs this task.

Unfortunately, timing information that might have been present in the original audiovisual stream might not have been preserved. The threads that processed the audio stream and the threads that processed the video stream might not have preserved such original timing information in the output that those threads produced. By the time both the audio stream and the video stream have reached a file writing thread, the audio stream and the video stream might lack any original timing information. Without such timing information, the file writing thread cannot be certain, for any frame of the video stream, which portion of the audio stream is supposed to be played at the time that the video frame is displayed. As a consequence of this uncertainty, the audio content and video content written to the output file are often out of synch.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to techniques described herein, a data stream is received as input. The data stream represents both video frames and audio samples; for example, the data stream may represent a movie. For each video frame in the data stream, there are one or more corresponding audio samples, at least a part of each of which is supposed to be played when that video frame is presented (in the case of HDV, a single video frame may correspond to several audio samples, or parts thereof, and different parts of a single audio sample may correspond to different video frames). The data stream might not represent the video frames and corresponding audio samples in order. For each video frame in the data stream, at least two data structures are produced as output. One of these data structures refers to the video frame, and the other one of these data structures refers to at least a part of an audio sample that corresponds to the video frame. Both of these data structures indicate a time at which both the video frame and the corresponding audio sample, or part thereof, should be presented.

As the data structures are passed among threads of a multithreaded program, the video frames and/or audio samples to which the data structures refer may be edited or processed in other ways. One set of threads may process a data structure that refers to a video frame at the same time that another set of threads processes a data structure that refers to the corresponding audio sample part(s). However, the time indicated in each data structure is preserved throughout the processing. Thus, when the data structures are passed to a file writing thread, the file writing thread can determine, from the time indicated in each data structure, the audio samples, or parts thereof, that should be played when corresponding video frames are displayed. As a result, the file writing thread is able to match video frames to corresponding audio samples, or parts thereof, when writing both to an audiovisual output file, such as a movie file, and the audio and video content is properly synchronized within the audiovisual output file.

Example HDV System

Figure 1:
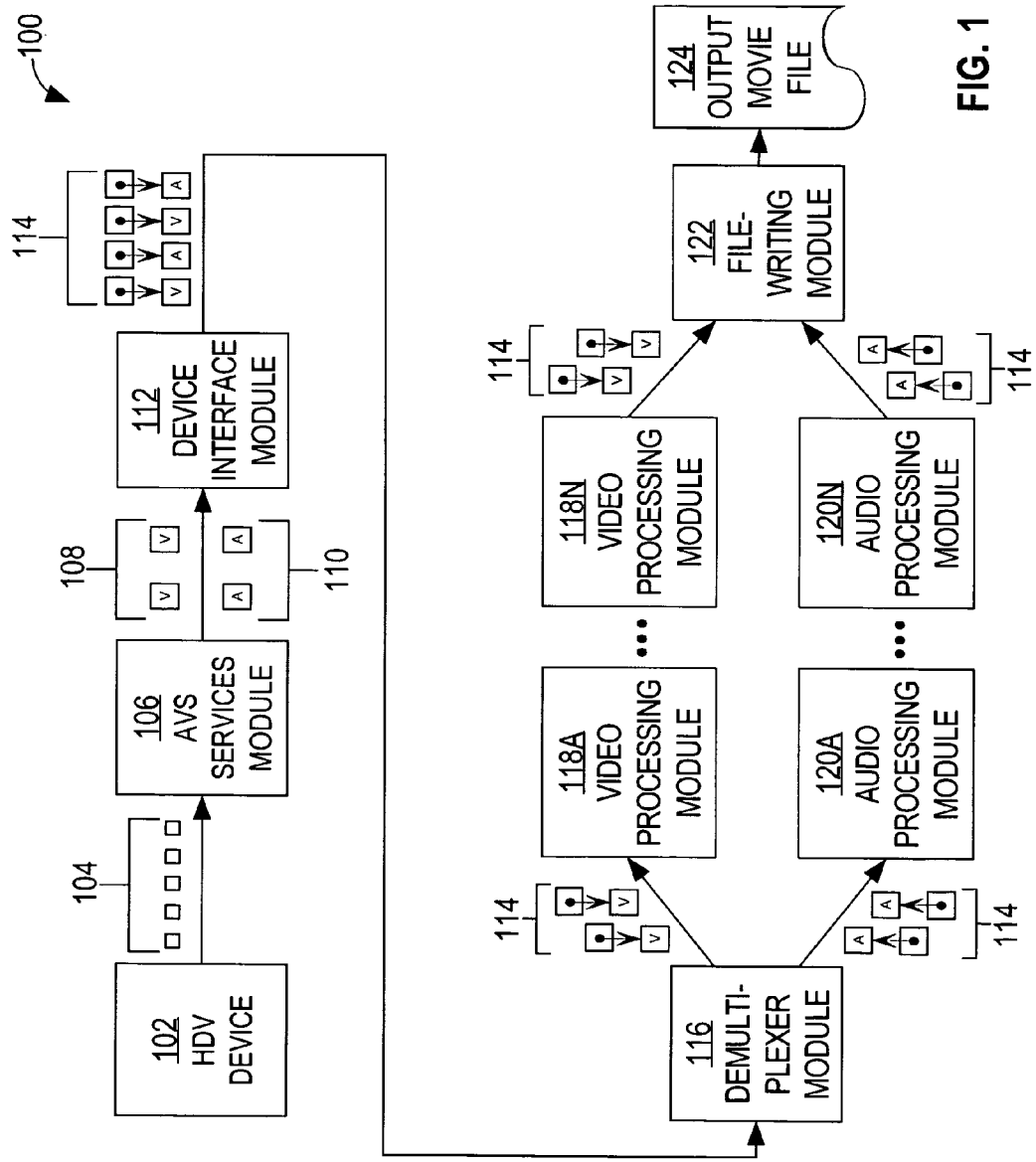
FIG. 1 is a block diagram illustrating an example system in which data structures that refer to audio content or video content and that indicate timing information for such content are created and passed between concurrently executing threads of a multithreaded computer program, according to an embodiment of the invention.

FIG. 1 is a block diagram illustrating an example system 100 in which data structures that refer to audio content or video content and that indicate timing information for such content are created and passed between concurrently executing threads of a multithreaded computer program, according to an embodiment of the invention. System 100 comprises an HDV device 102, an AVS services module 106, a device interface module 112, a demultiplexer module 116, video processing modules 118A-N, audio processing modules 120A-N, and a file-writing module 122. In one embodiment of the invention, all or parts of modules 112, 116, 118A-N, 120A-N, and 122 are programmatic modules that are implemented the same thread of execution that executes on a computer system. In alternative embodiments of the invention, one or more of modules 112, 116, 118A-N, 120A-N, and 122 are implemented in separate threads of execution that execute concurrently.

In one embodiment of the invention, HDV device 102 is a digital movie camera that captures both sound and images over time, and records these sounds and images on a medium such as a DV-compatible videotape. In one embodiment of the invention, HDV device 102 stores the captured sound and image data within an MPEG-2-compatible data stream.

The data stream is composed of multiple MPEG-2 Transport Stream (TS) data packets 104. In one embodiment of the invention, each TS data packet comprises 188 bytes of data, although in alternative embodiments of the invention this amount may differ. Some of TS data packets 104 contain audio content. Some of TS data packets 104 contain video content. Some of TS data packets 104 contain metadata. HDV device 102 transmits TS data packets 104 to AVS services module 106. For example, HDV device 102 may transmit TS data packet 104 to AVS services module 106 according to the Firewire/IEEE 1394 standard.

AVS services module 106 is a programmatic module that takes the form of a thread of execution executing on a computer in one embodiment of the invention. AVS services module 106 receives TS data packets 104 from HDV device 102. Based on the information contained in TS data packets 104, AVS services module creates video elementary packets 108 and audio elementary packets 110. Each video elementary packet may contain information from several TS data packets 104. Similarly, each audio elementary packet may contain information from several TS data packets 104.

Each of video elementary packets 108 may represent an I-frame, a P-frame, or a B-frame. Audio elementary packets 110 are MPEG-1 Layer 2 audio packets in one embodiment of the invention.

AVS services module 106 creates video elementary packets 108 and audio elementary packets 110 as AVS service module 106 receives TS data packets 104; AVS services module 106 does not need to receive an entire data stream before beginning to create video elementary packets 108 and audio elementary packets 110.

Each video elementary packet corresponds to one frame of video information in HD resolution; in other words, each video elementary packet corresponds to a separate image of a movie at a particular moment in time. Each audio elementary packet corresponds to one or more samples of audio information. For each video elementary packet, there are one or more corresponding audio elementary packet(s), at least parts of whose contents correspond to the same moment(s) in time to which that video elementary packet corresponds. When properly synchronized, at least a part of the audio content represented in an audio elementary packet should be played at the same time that the video content represented in the corresponding video elementary packet is displayed, to recreate the image and sound that occurred at the moment in time that the image and sound were originally recorded.

Content contained in video elementary packets 108 is preserved the same native format in which the content was represented on HDV device 102. The content is not decompressed into another format. Thus, P-frames remain P-frames, and B-frames remain B-frames. This conserves memory and reduces processing time.

AVS services module 106 sends video elementary packets 108 and audio elementary packets 110 to device interface module 112 as AVS services module 106 creates the packets; once an elementary packet is complete, AVS services module 106 sends that elementary packet to device interface module 112 without waiting for any other elementary packets to be created.

Device interface module 112 receives video elementary packets 108 and audio elementary packets 110 from AVS services module 106. For each video elementary packet or audio elementary packet that device interface module 112 receives, device interface module 112 creates a separate corresponding instance of a data structure. Each such instance is referred to herein as a "buffer wrapper."

Into each buffer wrapper, device interface module 112 inserts a master time that is associated with the corresponding video elementary packet or audio elementary packet. Thus, a buffer wrapper's master time travels with that buffer wrapper. The master time represents the time at which the content represented by the elementary packet should be presented (i.e., displayed or played). In one embodiment of the invention, device interface module 112 determines the master time based on data that is already contained in the original data stream. For example, device interface module 112 may read an SMPTE ("Society of Motion Picture Television Engineers") time code that is indicated in an HDV VAUX stream, and insert the SMPTE time code into an elementary packet's corresponding buffer wrapper.

Device interface module 112 stores each video elementary packet and each audio elementary packet in memory. Into each buffer wrapper, device interface module 112 inserts a reference or pointer that indicates where, in memory, the elementary packet that corresponds to that buffer wrapper is stored. Thus, a buffer wrapper may merely "point" to its corresponding elementary packet instead of actually containing a copy of that elementary packet.

According to one embodiment of the invention, into each buffer wrapper, device interface module 112 inserts a reference or pointer to description information that describes the content that is represented by the buffer wrapper's corresponding elementary packet. For example, if a buffer wrapper corresponds to an audio elementary packet, then device interface module 112 may insert, into the buffer wrapper, a pointer to description information that indicates that the content to which the buffer wrapper refers is particular kind of audio content. For another example, if a buffer wrapper corresponds to a video elementary packet, then device interface module 112 may insert, into the buffer wrapper, a pointer to description information that indicates that the content to which the buffer wrapper refers is particular kind of video content. In one embodiment of the invention, the description information to which a video elementary packet's buffer wrapper refers indicates whether that video elementary packet represents an I-frame, a P-frame, or a B-frame. In one embodiment of the invention, the description information indicates an image aspect ratio (e.g. 4:3 or 16:9).

In one embodiment of the invention, device interface module 112 determines the particular kind of audio or video content that an elementary packet contains based on information that is encoded within the audio or video content itself. If two or more buffer wrappers refer to similar content, as will often be the case, then all of those buffer wrappers may contain pointers to the same description information.

The buffer wrappers that device interface module 112 creates are collectively shown as buffer wrappers 114. Device interface module 112 sends buffer wrappers 114 to demultiplexer module 116 as device interface module 112 creates the buffer wrappers.

Demultiplexer module 116 receives buffer wrappers 114 from device interface module 112. For each buffer wrapper, demultiplexer module 116 examines the description information to which the buffer wrapper refers. Based on the description information, demultiplexer module 116 sends the buffer wrapper to either video processing modules 118A-N or audio processing modules 120A-N. If the description information indicates video content, then demultiplexer module 116 sends the buffer wrapper to video processing modules 118A-N. Alternatively, if the description information indicates audio content, then demultiplexer module 116 sends the buffer wrapper to audio processing modules 120A-N.

One or more of video processing modules 118A-N may alter the content within the video elementary packet to which a buffer wrapper points. One or more of audio processing modules 120A-N may alter the content within the audio elementary packet to which a buffer wrapper points. In either case, such alteration may be performed in response to user input, such as user input received through a graphical user interface (GUI) of a movie-editing program.

Video processing modules 118A-N may pass buffer wrappers between themselves. Similarly, audio processing modules 120A-N may pass buffer wrappers between themselves. For each buffer wrapper, the master time indicated in that buffer wrapper travels with that buffer wrapper as that buffer wrapper travels between these modules.

After potentially processing the contents of the audio elementary packets and/or the video elementary packets to which buffer wrappers 114 refer, video processing modules 118A-N and audio processing modules 120A-N send buffer wrappers 114 to file writing module 122.

File-writing module 122 writes the contents of video elementary packets 108 and audio elementary packets 110 to an output movie file 124. For example, file-writing module 122 may write such contents to an Apple QuickTime file. The contents written to output movie file 124 are represented in the same native format in which the contents were represented on HDV device 102. Thus, an MPEG-2-Video-Elementary-Stream-compatible data stream may be written to output movie file 124.

Among other information written to output movie file 124, file-writing module 122 writes the master times that are contained in the buffer wrappers that refer to the audio elementary packets and video elementary packets whose contents file-writing module 122 is writing to output movie file 124. As a result, timing information for each video frame and corresponding audio samples are preserved in output movie file 124. A computer program that subsequently reads and plays back the contents of output movie file 124 may use the timing information to synchronize properly the file's audio content with the file's video content.

Example DV System

Figure 2:
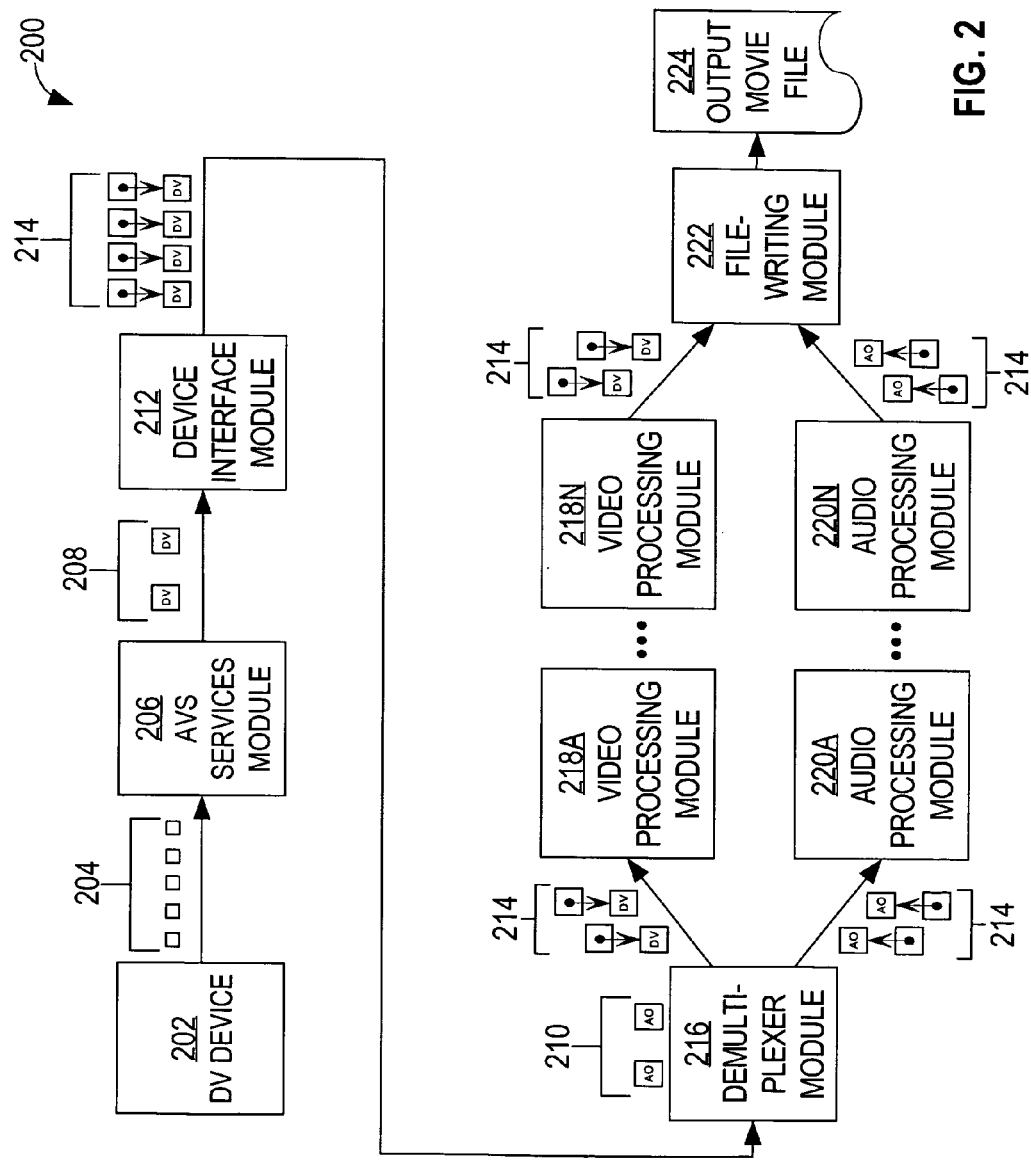
FIG. 2 is a block diagram illustrating an example system in which data structures that refer to DV content and that indicate timing information for such content are created and passed between concurrently executing threads of a multi-threaded computer program, according to an embodiment of the invention.

The buffer wrappers described above also may be used beneficially in a DV system. FIG. 2 is a block diagram illustrating an example system 200 in which data structures that refer to DV content and that indicate timing information for such content are created and passed between concurrently executing threads of a multithreaded computer program, according to an embodiment of the invention. System 200 comprises a DV device 202, an AVS services module 206, a device interface module 212, a demultiplexer module 216, video processing modules 218A-N, audio processing modules 220A-N, and a file-writing module 222.

In one embodiment of the invention, DV device 202 is a digital movie camera that captures both sound and images over time, and records these sounds and images on a medium such as a DV-compatible videotape. In one embodiment of the invention, DV device 202 stores the captured sound and image data within a data stream that comprises a series of I-frames.

DV device 202 transmits isochronous data packets 204 to AVS services module 206. Based on the information contained in isochronous data packets 204, AVS services module creates DV packets 208. Each DV packet may contain information from several isochronous data packets 204. Each of DV packets 208 represents a separate I-frame and some audio samples. For example, each of DV packets 208 may represent 1600 or 1602 audio samples.

AVS services module 206 sends DV packets 208 to device interface module 212. For each DV packet that device interface module 212 receives, device interface module 212 creates a separate buffer wrapper. Into each buffer wrapper, device interface module 212 inserts a master time that is associated with the corresponding DV packet. Device interface module 212 stores each DV packet in memory. Into each buffer wrapper, device interface module 212 inserts a reference or pointer that indicates where, in memory, the DV packet that corresponds to that buffer wrapper is stored.

According to one embodiment of the invention, into each buffer wrapper, device interface module 212 inserts a reference or pointer to description information that describes the content that is represented by the buffer wrapper's corresponding DV packet. For example, device interface module 212 may insert, into the buffer wrapper, a pointer to description information that indicates that the content to which the buffer wrapper refers is DV content.

The buffer wrappers that device interface module 212 creates are collectively shown as buffer wrappers 214. Device interface module 212 sends buffer wrappers 214 to demultiplexer module 216.

Demultiplexer module 216 receives buffer wrappers 214 from device interface module 212. For each "original" buffer wrapper that demultiplexer module 216 receives, demultiplexer module 216 reads the audio content from the DV packet to which the buffer wrapper refers. For each such buffer wrapper, demultiplexer module 216 creates a new audio-only packet, which contains the audio content read from the DV packet, but not any of the video content. Demultiplexer module 216 stores each such audio-only packet in memory. For each such audio-only packet created, demultiplexer module 216 creates a new buffer wrapper and inserts, into the new buffer wrapper, (a) a reference or pointer to that audio-only packet, and (b) a master time that is the same as the master time indicated in the "original" buffer wrapper that refers to the DV packet from which that audio-only packet's content was read. In the discussion below, the new audio-only packets are collectively called audio-only packets 210, and the new buffer wrappers that refer to audio-only packets 210 are considered to be included within buffer wrappers 214.

In one embodiment of the invention, demultiplexer module 216 modifies or augments the description information to which buffer wrappers 214 refer. For example, for each buffer wrapper that refers to a complete DV packet, demultiplexer module 216 may adjust the description information to which that buffer wrapper refers to indicate that the buffer wrapper refers to video content. For another example, for each buffer wrapper that refers to an audio-only packet, demultiplexer module 216 may adjust the description information to which that buffer wrapper refers to indicate that the buffer wrapper refers to audio content.

For each of buffer wrappers 214, demultiplexer module 216 sends the buffer wrapper to either video processing modules 218A-N or audio processing modules 220A-N. If the description information indicates video content, then demultiplexer module 216 sends the buffer wrapper to video processing modules 218A-N. Alternatively, if the description information indicates audio content, then demultiplexer module 216 sends the buffer wrapper to audio processing modules 220A-N.

After potentially processing the contents of the DV packets and/or the audio-only packets to which buffer wrappers 214 refer, video processing modules 218A-N and audio processing modules 220A-N send buffer wrappers 214 to file writing module 222.

File-writing module 222 writes the contents of DV packets 208 and audio-only packets 210 to an output movie file 224. Among other information written to output movie file 224, file-writing module 222 writes the master times that are contained in the buffer wrappers that refer to the audio-only packets and DV packets whose contents file-writing module 222 is writing to output movie file 224.

Reference Counts

As is described above with reference to FIG. 1 and FIG. 2, a module may store a media content-containing packet, such as a video elementary packet, an audio elementary packet, a DV packet, or an audio-only packet, in memory. The module may create a buffer wrapper that contains a reference or pointer to that packet.

If, at some point in time, no module needs the content inside of the packet anymore, then preserving the packet only wastes memory. For example, after the contents of a packet have been written to an output movie file, there may not be any need to retain the packet in memory. In order to keep track of whether any modules are using a packet, in one embodiment of the invention, each buffer wrapper contains a reference count.

A buffer wrapper's reference count indicates how many modules are using the contents of the packet to which the buffer wrapper refers. In one embodiment of the invention, whenever a module creates or receives a buffer wrapper, the module increments the buffer wrapper's reference count. In one embodiment of the invention, whenever a module is done accessing the contents of the packet to which the buffer wrapper refers, the module decrements the buffer wrapper's reference count.

In one embodiment of the invention, whenever a buffer wrapper's reference count is decremented to zero, the buffer wrapper is dereferenced, and the memory that the buffer wrapper occupied may be freed and used for other purposes thereafter. In one embodiment of the invention, whenever a buffer wrapper's reference count is decremented to zero, the packet to which the data buffer refers is dereferenced, and the memory that the packet occupied may be freed and used for other purposes thereafter.

Presentation Time and Decode Time

In the case of an HDV data stream, some of the elementary packets may have a presentation time that differs from those elementary packets' decode times. An elementary packet's presentation time is the time at which the elementary packet's contents should be presented (i.e., displayed in the case of video and played in the case of audio) relative to the contents of other packets in the data stream. In contrast, an elementary packet's decode time is the time at which the elementary packet's contents should be decoded relative to the contents of the packets in the data stream.

For example, a data stream may comprise a sequence of video elementary packets whose contents represent, in order, an I-frame, a B-frame, a B-frame, a P-frame, a B-frame, and a B-frame. The packets may be ordered by ascending decode time; in other words, the contents of the I-frame packet may need to be decoded before the contents of the B-frame packet that follows, because the proper interpretation of the contents of the B-frame packet may depend on the interpretation of the contents of the preceding I-frame packet. However, the packets may be out-of-order in terms of presentation time. Although the I-frame packet might need to be decoded before the B-frame packet can be decoded, the contents of the B-frame packet might need to be presented before the contents of the I-frame packet are presented.

Therefore, in one embodiment of the invention, each buffer wrapper indicates at least two separate master times: a presentation master time for the corresponding packet's presentation time, and a decode master time for the corresponding packet's decode time. Both of these master times travel with the buffer wrapper between modules. In one embodiment of the invention, a file-writing module writes both of these master times into the output movie file for each elementary packet.

Detecting Anomalies Through Buffer Wrapper Flagging

It is possible that some error may occur as data flows from an HDV or DV device through many modules before being written to an output movie file, as described above. For various reasons, the contents of a packet might become lost or corrupted. Under some circumstances, such a defect can be remedied or ignored. Under other circumstances, such a defect requires a file-writing module, and possibly other modules, to take action to prevent an entire output movie file from being corrupted. For example, if an I-frame in an MPEG-2 data stream is lost, then any B-frames that depend upon that I-frame may become undecodable.

Therefore, in one embodiment of the invention, when an error or inconsistency is detected in a packet or stream of packets, the module that detected the error or inconsistency adds, to the buffer wrapper that refers to the irregular packet, one or more references or pointers to flag information. Such flag information may indicate, for example, that there is a problem with the packet to which the buffer wrapper refers. In one embodiment of the invention, the flag information indicates the specific nature of the packet's problem.

As other modules, such as a file-writing module, receive the buffer wrapper, these other modules may inspect the flag information to which the buffer wrapper refers, and take appropriate action. For example, in response to reading particular flag information referenced in a buffer wrapper, a file-writing module may stop writing to the current output movie file, open a new output movie file, and begin writing to the new output movie file instead.

Writing MPEG-2 Data to an Output Movie File

In one embodiment of the invention, before actually writing a data packet's contents to an output movie file, a file-writing module queues up the buffer wrappers that collectively correspond to a complete "group of pictures" (GOP). Typically, a complete GOP begins with an I-frame and is followed by one or more B-frames and/or P-frames. The existence of a succeeding I-frame in a decode-order stream typically indicates the beginning of the next GOP. In one embodiment of the invention, the file-writing module inspects the description information to which a buffer wrapper refers in order to determine whether the video elementary packet to which the buffer wrapper refers contains an I-frame, a P-frame, or a B-frame.

In one embodiment of the invention, after queuing up a complete GOP, a file-writing module re-orders the buffer wrappers corresponding to the GOP so that the buffer wrappers are in presentation order rather than decode order. After reordering the buffer wrappers in this manner, the file-writing module sends the buffer wrappers, or copies thereof, to a separate client application program. The client application program receives the buffer wrappers in presentation order.

Based on user input, the client application program may determine that a new output movie file should begin with a particular image that corresponds to a particular frame in the GOP. The client application program may instruct the file-writing module to begin writing a new output movie file such that the particular image is the first image that will be presented when the new output movie file is played back. The client application program may indicate, to the file-writing module, the identity of the buffer wrapper that corresponds to the frame that represents the particular image.

In the case of an MPEG-2 data stream, the particular image selected by the client application may correspond to a B-frame or P-frame rather than an I-frame. However, the output movie file, which represents frames in decode order rather than presentation order, cannot exclude the preceding I-frame upon which the B-frame or P-frame depends; if the preceding I-frame were excluded, then the B-frame or P-frame would be undecodable.

Therefore, in one embodiment of the invention, when a client application program or other module instructs a file writing module to begin a new output movie file with a particular frame in a GOP, the file writing module actually starts writing the new output movie file with the I-frame that occurs at the start of the GOP in decode order. The file-writing module writes the entire GOP to the new output movie file. This is so even if the frame selected by the client application program occurs in the middle of the GOP in decode order.

In one embodiment of the invention, the file-writing module also retains, in its queue, the GOP preceding the current GOP in the data stream. In one embodiment of the invention, whenever the file-writing module begins writing to a new output movie file, the file-writing module writes the contents of the frames in the GOP preceding the current GOP before writing the contents of the frames in the current GOP.

Writing Description Information to an Output Movie File

In one embodiment of the invention, the file-writing module writes, into an output movie file, additional information that a buffer wrapper contains or to which a buffer wrapper refers. For example, a file-writing module may read description information to which a buffer wrapper refers. The description information may indicate that the data stream is a particular type of data stream, such as MPEG-2, HDV, etc. The file-writing module may write the description information into the output movie file for the benefit of computer programs that will later read and play the output movie file.

In one embodiment of the invention, whenever the description information for one buffer wrapper indicates a different type of data stream, image resolution, or image aspect ratio (e.g. 4:3 or 16:9) than the description information for the preceding buffer wrapper, the file-writing module stops writing to the current output movie file, opens a new output movie file, and begins writing to the new movie file.

Time-of-Day Information

In some data streams, time-of-day information, that indicates the time of day at which a particular frame was recorded, is included in the data stream. In one embodiment of the invention, a module (e.g., a device interface module) reads this time-of-day information. For example, such information can be read from an HDV VAUX stream. In one embodiment of the invention, a module inserts the time-of-day information into buffer wrappers that refer to video elementary packets. In one embodiment of the invention, such information is, alternatively or additionally, inserted into I-frames and P-frames. In one embodiment of the invention, other modules (e.g., a file-writing module) can use this information to determine significant time breaks between frames in a data stream. Based on such a determination, a file-writing module might determine that a new output movie file should be opened for the frames that occur after the time break, for example.

Hardware Overview

Figure 3:
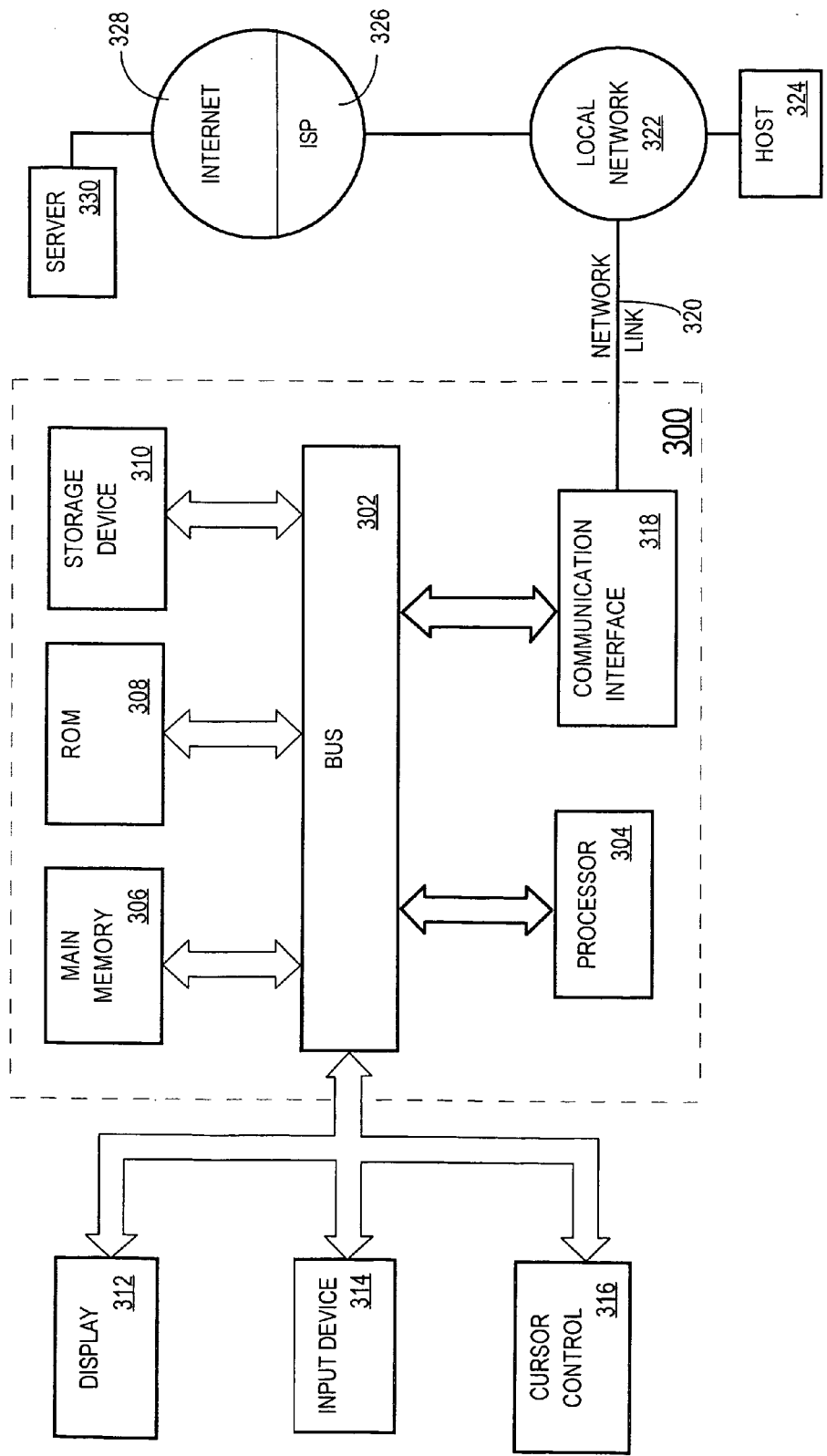
FIG. 3 is a block diagram of a computer system on which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for synchronizing video and audio content, the method comprising:
   receiving a stream that represents (a) one or more frames and (b) one or more audio samples that at least partially correspond to the one or more video frames; and
   for each video frame of the one or more video frames, outputting at least (a) a first data structure that refers to a location in memory of the video frame, and (b) a second data structure that refers to a location in memory of an audio sample, of the one or more audio samples, that at least partially corresponds to the video frame;
   wherein both the first data structure and the second data structure indicate a time at which both the video frame and the audio sample should be presented;
   wherein the one or more video frames, which are represented in the stream, include a particular video frame;
   wherein the step of outputting includes:
      outputting a particular first data structure that refers to the location in memory of the particular video frame, and
      outputting a particular second data structure that refers to the location in
      memory of a particular audio sample that at least partially corresponds to the particular video frame;
      sending the particular first data structure that refers to the particular video frame to a thread that performs an operation on the particular video frame without sending the particular video frame to the thread;
      wherein the thread accesses the particular video frame from the memory based on the location indicated in the particular first data structure for the particular video frame;
      after the thread performs the operation on the particular video frame, sending the particular first data structure to a file writing module that writes the particular video frame to an output file;
   wherein the method is performed by one or more computing devices.

2. The method of claim 1, wherein the particular video frame represents a High Definition (HD) image.

3. The method of claim 1, wherein the stream is stored on a Digital Video (DV) storage medium.

4. The method of claim 1, further comprising:
   writing the contents of the one or more video frames to the output file;
   wherein, at no point between the original source of the video frames and the output file, does a format to which the one or more video frames conform change;
   wherein the format to which the one or more video frames conform is MPEG-2 Video Elementary Stream format.

5. The method of claim 1, further comprising:
   determining, based on (a) a time indicated in the particular first data structure that refers to the particular video frame, and (b) a time indicated in the particular second data structure that refers to the particular audio sample, whether the particular video frame corresponds to at least a part of the particular audio sample.

6. The method of claim 1, further comprising:
   writing the particular audio sample to the output file;
   writing, to the output file, timing information that is indicated in the particular first data structure that refers to the particular video frame; and
   writing, to the output file, timing information that is indicated in the particular second data structure that refers to the particular audio sample.

7. The method of claim 1, further comprising:
   incrementing a reference count that is indicating in the particular first data structure;
   wherein the reference count indicates how many separate modules are using the particular video frame.

8. The method of claim 1, further comprising:
   sending the particular first data structure to a first thread of execution; and
   sending the particular second data structure to a second thread of execution;
   wherein the first thread executes concurrently with the second thread; and
   wherein the first thread is separate from the second thread.

9. The method of claim 1, wherein the neither the particular first data structure nor the particular second data structure contains the particular video frame.

10. The method of claim 1, further comprising:
   inserting, into the particular first data structure, a reference to description information that describes that particular video frame.

11. The method of claim 10, wherein the description information indicates that the particular video frame is one of an I-frame, a P-frame, and a B-frame.

12. The method of claim 1, wherein:
   the first data structure refers to a complete Digital Video (DV) frame; and
   the second data structure refers to audio content that is represented in the DV frame, but not any video content that is represented in the DV frame.

13. The method of claim 1, wherein:
   the particular first data structure indicates a time at which the particular video frame should be decoded relative to one or more other video frames; and
   the time at which the particular video frame should be decoded differs from the time at which the particular video frame should be presented.

14. The method of claim 1, further comprising:
   detecting a problem with the particular video frame; and in response to detecting the problem with the particular video frame, inserting, into the particular first data structure, information that indicates that there is a problem with the particular video frame.

15. The method of claim 1, wherein the particular first data structure indicates a time of day that is associated with the particular video frame.

16. The method of claim 1, wherein the particular first data structure refers to description information that indicates a width-to-height ratio of an image that is represented by the particular video frame.

17. The method of claim 1, further comprising:
receiving input that indicates that the output file is to begin with an image that is only partially represented by the particular video frame;
in response to receiving the input, identifying a group of pictures to which the image belongs; and
prior to writing, to the output file, content that is represented by the particular video frame, writing, to the output file, content that is represented by an I-frame that occurs at the beginning of the group of pictures.

18. The method of claim 1, wherein the method further comprises:
sending the particular second data structure that refers to the particular audio sample that at least partially corresponds to the particular video frame to a second thread that performs an operation on the audio sample without sending the corresponding audio sample to the second thread,
wherein the second thread accesses the particular audio sample from the memory based on the location indicated in the particular second data structure for the audio sample.

19. A non-transitory computer-readable storage medium storing instructions which, when executed by one or more processors, causes:
receiving a stream that represents (a) one or more video frames and (b) one or more audio samples that at least partially correspond to the one or more video frames; and
for each video frame of the one or more video frames, outputting at least (a) a first data structure that refers to a location in memory of the video frame, and (b) a second data structure that refers to a location in memory of an audio sample, of the one or more audio samples, that at least partially corresponds to the video frame;
wherein both the first data structure and the second data structure indicate a time at which both the video frame and the audio sample should be presented;
wherein the one or more video frames, which are represented in the stream, include a particular video frame;
wherein the step of outputting includes:
outputting a particular first data structure that refers to the location in memory of the particular video frame, and
outputting a particular second data structure that refers to the location in memory of a particular audio sample that at least partially corresponds to the particular video frame;
sending the particular first data structure that refers to the particular video frame to a thread that performs an operation on the particular video frame without sending the particular video frame to the thread;
wherein the thread accesses the particular video frame from the memory based on the location indicated in the particular first data structure for the particular video frame;
after the thread performs the operation on the particular video frame, sending the particular first data structure to a file writing module that writes the particular video frame to an output file.

20. The non-transitory computer-readable storage medium of claim 19, wherein the particular video frame represents a High Definition (HD) image.

21. The non-transitory computer-readable storage medium of claim 19, wherein the stream is stored on a Digital Video (DV) storage medium.

22. The non-transitory computer-readable storage medium of claim 19, wherein the instructions, when executed by the one or more processors, further cause:
writing the contents of the one or more video frames to the output file;
wherein, at no point between the original source of the video frames and the output file, does a format to which the one or more video frames conform change;
wherein the format to which the one or more video frames conform is MPEG-2 Video Elementary Stream format.

23. The non-transitory computer-readable storage medium of claim 19, wherein the instructions, when executed by the one or more processors, further cause:
determining, based on (a) a time indicated in the particular first data structure that refers to the particular video frame, and (b) a time indicated in the particular second data structure that refers to the particular audio sample, whether the particular video frame corresponds to at least a part of the particular audio sample.

24. The non-transitory computer-readable storage of claim 19, wherein the instructions, when executed by the one or more processors, further cause:
writing the particular audio sample to the output file;
writing, to the output file, timing information that is indicated in the particular first data structure that refers to the particular video frame; and
writing, to the output file, timing information that is indicated in the particular second data structure that refers to the particular audio sample.

25. The non-transitory computer-readable storage medium of claim 19, wherein the instructions, when executed by the one or more processors, further cause:
incrementing a reference count that is indicated in the particular first data structure;
wherein the reference count indicates how many separate modules are using the particular video frame.

26. The non-transitory computer-readable storage medium of claim 19, wherein the instructions, when executed by the one or more processors, further cause:
sending the particular first data structure to a first thread of execution; and
sending the particular second data structure to a second thread of execution;
wherein the first thread executes concurrently with the second thread; and
wherein the first thread is separate from the second thread.

27. The non-transitory computer-readable storage medium of claim 19, wherein neither the particular first data structure nor the particular second data structure contains the particular video frame.

28. The non-transitory computer-readable storage medium of claim 19, wherein the instructions, when executed by the one or more processors, further cause:
inserting, into the particular first data structure, a reference to description information that describes the particular video frame.

29. The non-transitory computer-readable storage medium of claim 28, wherein the description information indicates that the particular video frame is one of an I-frame, a P-frame, and a B-frame.

30. The non-transitory computer-readable storage medium of claim 19, wherein:
- the first data structure refers to a complete Digital Video (DV) frame; and
- the second data structure refers to audio content that is represented in the DV frame, but not any video content that is represented in the DV frame.

31. The non-transitory computer-readable storage medium of claim 19, wherein:
- the particular first data structure indicates a time at which the particular video frame should be decoded relative to one or more other video frames; and
- the time at which the particular video frame should be decoded differs from the time at which the particular video frame should be presented.

32. The non-transitory computer-readable storage medium of claim 19, wherein the instructions, when executed by the one or more processors, further cause:
- detecting a problem with the particular video frame; and
- in response to detecting the problem with the particular video frame, inserting, into the particular first data structure, information that indicates that there is a problem with the particular video frame.

33. The non-transitory computer-readable storage medium of claim 19, wherein the particular first data structure indicates a time of day that is associated with the particular video frame.

34. The non-transitory computer-readable storage medium of claim 19, wherein the particular first data structure refers to description information that indicates a width-to-height ratio of an image that is represented by the particular video frame.

35. The non-transitory computer-readable storage medium of claim 19, wherein the instructions, when executed by the one or more processors, further cause:
- receiving input that indicates that the output file is to begin with an image that is only partially represented by the particular video frame;
- in response to receiving the input, identifying a group of pictures to which the image belongs; and
- prior to writing, to the output file, content that is represented by the particular video frame, writing, to the output file, content that is represented by an I-frame that occurs at the beginning of the group of pictures.

36. The non-transitory computer-readable storage medium of claim 19, wherein the instructions, when executed by the one or more processors, further cause:
- sending the particular second data structure that refers to the particular audio sample that at least partially corresponds to the particular video frame to a second thread that performs an operation on the audio sample without sending the corresponding audio sample to the second thread,
- wherein the second thread accesses the particular audio sample from the memory based on the location indicated in the particular second data structure for the audio sample.

* * * * *